United States Patent
Qin et al.

(10) Patent No.: US 12,475,330 B2
(45) Date of Patent: Nov. 18, 2025

(54) METHOD FOR IDENTIFYING NOISE SAMPLES, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Huapeng Qin, Beijing (CN); Min Zhao, Beijing (CN); Guoxin Zhang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 294 days.

(21) Appl. No.: 17/956,558

(22) Filed: Sep. 29, 2022

(65) Prior Publication Data
US 2023/0023789 A1    Jan. 26, 2023

(30) Foreign Application Priority Data

Sep. 30, 2021  (CN) .......................... 202111165584.4

(51) Int. Cl.
*G06F 40/51*  (2020.01)
*G06F 40/47*  (2020.01)
(Continued)

(52) U.S. Cl.
CPC .............. *G06F 40/51* (2020.01); *G06F 40/47* (2020.01); *G06F 40/49* (2020.01); *G06F 40/55* (2020.01)

(58) Field of Classification Search
CPC .......... G06F 40/51; G06F 40/47; G06F 40/49; G06F 40/55
See application file for complete search history.

(56) References Cited

U.S. PATENT DOCUMENTS

2022/0067280 A1* 3/2022 Wagner ................... G06N 3/084
2022/0092274 A1* 3/2022 Arivazhagan ........... G06F 40/47
(Continued)

FOREIGN PATENT DOCUMENTS

CN    111524147 A    8/2020
CN    111950292 A    11/2020
(Continued)

OTHER PUBLICATIONS

D. Kim, J. Koo and U.-M. Kim, "EnvBERT: Multi-Label Text Classification for Imbalanced, Noisy Environmental News Data," 2021 15th International Conference on Ubiquitous Information Management and Communication (IMCOM), Seoul, Korea (South), 2021, pp. 1-8, doi: 10.1109/IMCOM51814.2021.9377411. (Year: 2021).*

(Continued)

*Primary Examiner* — Andrew C Flanders
*Assistant Examiner* — Theodore Withey
(74) *Attorney, Agent, or Firm* — Lippes Mathias LLP

(57) ABSTRACT

The method for identifying noise samples, includes: obtaining an original sample set; obtaining a target sample set by adding masks to original training corpora in the original sample set using a preset adjustment rule; performing mask prediction on a plurality of target training corpora in the target sample set using a pre-trained language model to obtain a first mask prediction character corresponding to each target training corpus; matching the first mask prediction character corresponding to each target training corpus with a preset condition; and according to target training corpora of which first mask prediction characters do not match the preset condition in the target sample set, determining corresponding original training corpora in the original sample set as noise samples.

10 Claims, 9 Drawing Sheets

(51) Int. Cl.
  *G06F 40/49* (2020.01)
  *G06F 40/55* (2020.01)

(56) References Cited

U.S. PATENT DOCUMENTS

| | | | | |
|---|---|---|---|---|
| 2022/0245337 A1* | 8/2022 | Wu | ............... | G06N 5/022 |
| 2022/0358906 A1* | 11/2022 | Roitman | ............ | G06F 40/30 |
| 2023/0029196 A1* | 1/2023 | Huang | ............ | G06F 40/56 |

FOREIGN PATENT DOCUMENTS

| | | | | | |
|---|---|---|---|---|---|
| CN | 111950540 A | * | 11/2020 | | |
| CN | 113268996 A | * | 8/2021 | | |
| WO | WO-2022015730 A1 | * | 1/2022 | ............ | G06F 3/0482 |

OTHER PUBLICATIONS

Sun, Xiaodi, et al. "DynaMaR: Dynamic prompt with mask token representation." arXiv preprint arXiv:2206.02982 (2022). (Year: 2022).*

Ding, Ning, et al. "Prompt-learning for fine-grained entity typing." arXiv preprint arXiv:2108.10604 (2021). (Year: 2021).*

Kim, Dohyung et al., "EnvBERT: Multi-label Text Classification for Imbalanced, Noisy Environmental News Data"; IEEE, Jan. 4, 2021; 8 pages.

Search Report for European Patent Application No. 22196567.6 dated Feb. 16, 2023.

Garg, Siddhant et al., "Towards Robustness to Label Noise in Text Classification via Noise Modeling", ICLR 2021; Apr. 22, 2021; 8 pages.

Apostolova, Emilia et al., "Training and Prediction Data Discrepancies: Challenges of Text Classification with Noisy, Historical Data", Sep. 11, 2018; 6 pages.

OA for CN application 202111165584.4, dated Apr. 30, 2025, 12 pgs.

* cited by examiner

METHOD FOR IDENTIFYING NOISE SAMPLES, ELECTRONIC DEVICE, AND STORAGE MEDIUM

CROSS-REFERENCE TO RELATED APPLICATION

This application claims priority to Chinese Patent Application No. 202111165584.4, filed on Sep. 30, 2021, the content of which is hereby incorporated by reference in its entirety into this disclosure.

TECHNICAL FIELD

The disclosure relates to the field of computer technologies, especially to the field of artificial intelligence technologies such as natural language processing and deep learning, and in particular to a method for identifying noise samples, an electronic device, and a storage medium.

BACKGROUND

The quality of training samples plays a decisive role in natural language processing applications. Large-scale, high-quality training samples can often train good application models, for example deep learning models such as neural machine translation models. In practical applications, it is generally difficult to obtain high-quality training samples, which also causes great obstacles in the process of implementing the models into practical applications.

SUMMARY

According to an aspect of the disclosure, a method for identifying noise samples is provided, including: obtaining an original sample set; obtaining a target sample set by adding masks to original training corpora in the original sample set using a preset adjustment rule; performing mask prediction on a plurality of target training corpora in the target sample set using a pre-trained language model to obtain a first mask prediction character corresponding to each target training corpus; matching the first mask prediction character corresponding to each target training corpus with a preset condition; and according to target training corpora of which first mask prediction characters do not match the preset condition in the target sample set, determining corresponding original training corpora in the original sample set as noise samples.

According to another aspect of the disclosure, a method for training a model for identifying noise samples is provided, including: obtaining an original sample set, in which each original training corpus in the original sample set has a label; obtaining a target sample set by adding masks to original training corpora in the original sample set using a preset adjustment rule; performing mask prediction on a plurality of target training corpora in the target sample set using an initial language model to obtain a second mask prediction character corresponding to each target training corpus; adjusting model parameters of the initial language model according to a difference between the second mask prediction character corresponding to each target training corpus and the label of the corresponding original training corpora; and determining the language model obtained after adjusting as a language model for identifying noise samples.

According to another aspect of the disclosure, an electronic device is provided. The electronic device includes: at least one processor and a memory communicatively coupled to the at least one processor. The memory is configured to store instructions executable by the at least one processor, and when the instructions are executed by the at least one processor, the at least one processor is configured to perform the method for identifying noise samples according to the disclosure or the method for training a model for identifying noise samples according to the disclosure.

According to another aspect of the disclosure, a non-transitory computer-readable storage medium having computer instructions stored thereon is provided. The computer instructions are configured to cause a computer to perform the method for identifying noise samples according to the disclosure or the method for training a model for identifying noise samples according to the disclosure.

It should be understood that the content described in this section is not intended to identify key or important features of embodiments of the disclosure, nor is it intended to limit the scope of the disclosure. Additional features of the disclosure will be easily understood according to the following description.

BRIEF DESCRIPTION OF THE DRAWINGS

The drawings are used to better understand the solution and do not constitute a limitation to the disclosure, in which.

DETAILED DESCRIPTION

Figure 1:
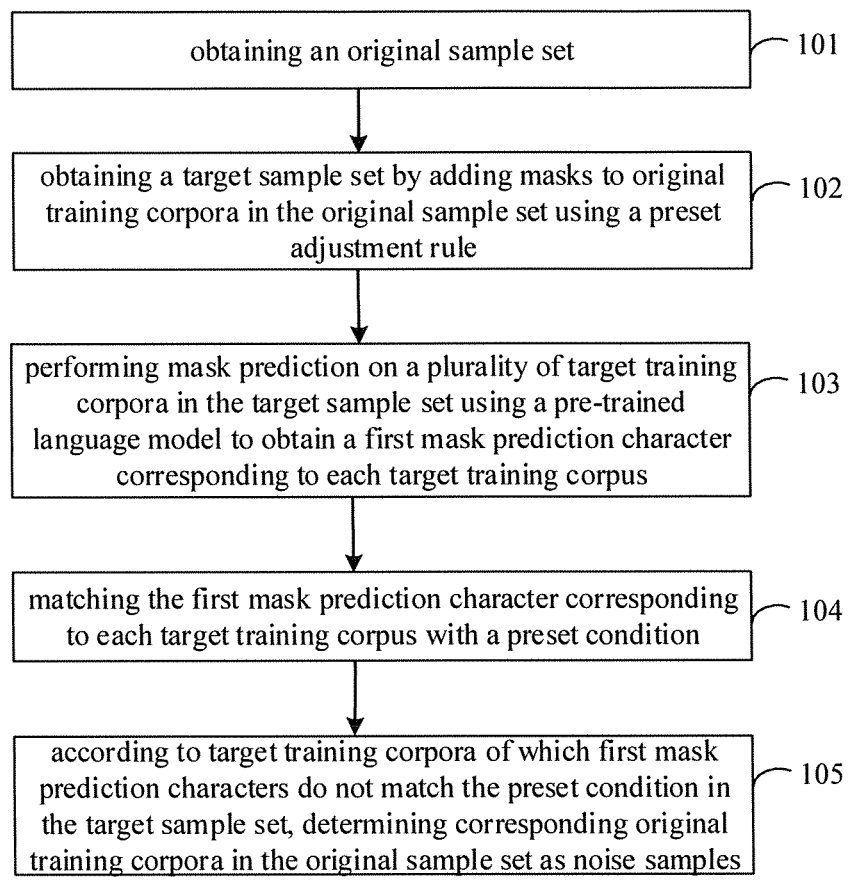
FIG. 1 is a flowchart of a method for identifying noise samples according to a first embodiment of the disclosure.

The following describes embodiments of the disclosure with reference to the drawings, which includes various details of embodiments of the disclosure to facilitate understanding and shall be considered merely exemplary. Therefore, those of ordinary skill in the art should recognize that various changes and modifications can be made to embodiments described herein without departing from the scope and spirit of the disclosure. For clarity and conciseness, descriptions of well-known functions and structures are omitted in the following description.

The disclosure relates to the field of computer technologies, in particular to the field of artificial intelligence (AI) technologies such as natural language processing and deep learning.

The following briefly describes technical fields involved in solutions of the disclosure.

AI is a discipline that studies computers to simulate certain thinking processes and intelligent behaviors (such as learning, reasoning, thinking and planning) of human, which has both hardware-level technologies and software-level technologies. AI hardware technology generally includes technologies such as sensors, dedicated AI chips, cloud computing, distributed storage, and big data processing. AI software technology generally includes computer vision technology, speech recognition technology, natural language processing technology, machine learning, deep learning, big data processing technology, knowledge map technology and other aspects.

Natural language processing (NLP) is a technology that uses natural language to communicate with computers. Because the key to process natural language is to make computers "understand" natural language, NLP is also called natural language understanding, also known as computational linguistics. On one hand, it is a branch of language information processing, and on the other hand, it is one of core topics of AI.

Deep learning (DL) is to learn inherent laws and representation levels of sample data. The information obtained in these learning processes is of great help to interpretation of data such as text, images and sounds. The ultimate goal of DL is to enable machines to have an ability of analyzing and learning like humans and of recognizing data such as words, images and sounds. DL is a complex machine learning algorithm that has achieved results in speech and image recognition far exceeding previous related technologies. DL has achieved many results in search technology, data mining, machine learning, machine translation, natural language processing, multimedia learning, speech, recommendation and personalization technology, and other related fields. DL enables machines to imitate human activities such as audiovisual and thinking, solves many complex pattern recognition problems, and makes great progress in AI-related technologies.

Currently, the quality of training samples plays a decisive role in natural language processing applications. Large-scale, high-quality training samples can often train good application models, for example deep learning models such as neural machine translation models. In practical applications, it is generally difficult to obtain high-quality training samples, which also causes great obstacles in the process of implementing the models into practical applications. Therefore, how to efficiently and accurately identify noise samples from training samples and obtain high-quality training samples is of great significance for training deep learning models with good effects using training samples.

The disclosure proposes a method capable of efficiently and accurately identifying noise samples. The method first obtains an original sample set, obtains a target sample set by adding masks to original training corpora in the original sample set using a preset adjustment rule, performs mask prediction on a plurality of target training corpora in the target sample set using a pre-trained language model to obtain a first mask prediction character corresponding to each target training corpus, matches the first mask prediction character corresponding to each target training corpus with a preset condition, and according to target training corpora of which first mask prediction characters do not match the preset condition in the target sample set, determines corresponding original training corpora in the original sample set as noise samples. As a result, noise samples can be efficiently and accurately identified from the original sample set, and human resources are saved.

The method and the apparatus for identifying noise samples, the method and the apparatus for training a model for identifying noise samples, the electronic device, the non-transitory computer-readable storage medium, and the computer program product according to embodiments of the disclosure are described below with reference to the accompanying drawings.

First, with reference to FIG. 1, the method for identifying noise samples provided by the disclosure will be described in detail.

FIG. 1 is a flowchart of a method for identifying noise samples according to a first embodiment of the disclosure. It should be noted that the method for identifying noise samples provided by embodiments of the disclosure is performed by an apparatus for identifying noise samples. The apparatus for identifying noise samples may be an electronic device, or software configured in the electronic device, etc., so as to efficiently and accurately identify noise samples in the original sample set. Some embodiments of the disclosure are described by taking an example that the apparatus for identifying noise samples is configured in the electronic device.

The electronic device can be any stationary or mobile computing device capable of data processing, for example, the mobile computing device such as a notebook computer, a smart phone and a wearable device, or the stationary computing device such as a desktop computer, a server, or other types of computing devices, which is limited in this disclosure.

As shown in FIG. 1, the method for identifying noise samples may include the following steps.

In step 101, an original sample set is obtained.

The original sample set is a training sample set from which noise samples need to be identified, including a plurality of original training corpora, and each original training corpus has a corresponding label.

The noise sample can be understood as labeling inconsistencies, such as the original training corpus whose actual category is "biological virus" but is labeled as "term", or there is sample confusion, such as the training task of the model is a classification task but the original training corpus is labeled as the translation result, or the original training corpus has other abnormal conditions, which is not limited in the disclosure.

The label corresponding to each original training corpus is related to the task type of the training task when the model is trained based on the original sample set. For example, when the training task is a noun phrase classification task, the label corresponding to the original training corpus can be the category label to which the noun phrase in the original training corpus belongs; when the training task is a translation task, the label corresponding to the original training corpus can be the translation result label corresponding to the original training corpus, and the like, which are not limited in this disclosure.

In step 102, a target sample set is obtained by adding masks to original training corpora in the original sample set using a preset adjustment rule.

In step 103, mask prediction is performed on a plurality of target training corpora in the target sample set using a pre-trained language model to obtain a first mask prediction character corresponding to each target training corpus.

In some embodiments, the pre-trained language model may be any type or structure of neural network model. The pre-trained language model can be obtained by training using a plurality of target training corpora and corresponding labels in the target sample set, or obtained by adding masks to training corpora in other sample sets to obtain a plurality of training corpora, and training using the plurality of obtained training corpora and corresponding labels, which is not limited in the disclosure.

The preset adjustment rule refers to the rule according to which the original training corpora in the original sample set are adjusted to obtain the target sample set. The preset adjustment rule is determined according to the task type of the training task of the pre-trained language model. The task type of the training task of the pre-trained language model can be understood as the style of the input corpus of the language model in the process of training to obtain the pre-trained language model. The target training corpus in the target sample set, obtained by masking the original training corpus in the original sample set using the preset adjustment rule, has the same style as the input corpus of the language model in the process of training to obtain the pre-trained language model.

In some embodiments, the training task of the pre-trained language model may be a prompt learning task, and correspondingly, the task type of the training task may include the [mask] mask in the input corpus, and the training target of the training task is to predict the position corresponding to the [mask] mask. It should be noted that when the position corresponding to the mask is predicted, the prediction result is related to the task type of the training task of the pre-trained language model. For example, when the task type of the training task of the pre-trained language model is a text classification task, the prediction of the position corresponding to the mask is specifically to predict the position corresponding to the mask as the correct category; when the task type is a translation task, predicting the position corresponding to the mask is specifically predicting the position corresponding to the mask as the correct translation result.

Correspondingly, in some embodiments of the disclosure, the preset adjustment rule can be used to add masks to the original training corpora in the original sample set to obtain the target sample set, and the target sample set includes a plurality of target training corpora, and then the plurality of target training corpora in the target sample set are respectively input into the pre-trained language model, and the mask prediction is performed, that is, the position corresponding to the mask in each target training corpus is predicted, and the first mask prediction character corresponding to each target training corpus is obtained. The first mask prediction character is the prediction result of the position corresponding to the mask.

For example, it is assumed the original training corpus is "ABC Science Park", the training task of the pre-trained language model is the prompt learning task, the task type is the noun phrase classification task, and the adjustment rule is to splice the original training corpus with the category label mask through the associated word "is" to obtain the target training corpus, in which the category label mask indicates that the corresponding position is predicted to be the category corresponding to the original training corpus. Then, using this adjustment rule, the [mask] mask is added to the original training corpus to obtain the target training corpus "ABC Science Park is [mask][mask]", and the target training corpus is input into the pre-trained language model for mask prediction, to obtain "ABC Science Park is a place", where "place" is the first mask prediction character corresponding to the target training corpus "ABC Science Park is [mask][mask]".

In step 104, the first mask prediction character corresponding to each target training corpus is matched with a preset condition.

In step 105, according to target training corpora of which first mask prediction characters do not match the preset condition in the target sample set, corresponding original training corpora in the original sample set are determined are noise samples.

In some embodiments, it is preset that if the original training corpus in the original sample set is a noise sample, the first mask prediction character corresponding to the corresponding target training corpus needs to satisfy the condition. Therefore, when the first mask prediction character corresponding to each target training corpus, the first mask prediction character corresponding to the target training corpus can be matched with the preset condition, and according to the target training corpus in which the first mask prediction character does not match the preset condition in the target sample set, the corresponding original training corpus in the original sample set is determined as the noise sample.

Since the task type of the training task of the pre-trained language model (that is, predicting by means of mask prediction) is more sensitive to noise samples, if the input corpus of the pre-trained language model is a noise sample, it will directly and significantly affect the performance of the language model, so that the preset adjustment rule is used to add the mask to the original training corpus in the original sample set to obtain the target training corpus, and the pre-trained language model is used to perform the mask prediction on the plurality of target training corpus. According to uncontrollable results of mask prediction, noise samples in the original sample set can be identified, which can realize the accurate identification of noise samples. In addition, since it can replace a human to identify a large amount of original training corpus, the identification efficiency of noise samples is improved, and human resources are saved.

In conclusion, the method for identifying noise samples provided by embodiments of the disclosure obtains an original sample set, obtains a target sample set by adding masks to original training corpora in the original sample set using a preset adjustment rule, performs mask prediction on a plurality of target training corpora in the target sample set using a pre-trained language model to obtain a first mask prediction character corresponding to each target training corpus, matches the first mask prediction character corresponding to each target training corpus with a preset condition, and according to target training corpora of which first mask prediction characters do not match the preset condition in the target sample set, determines corresponding original training corpora in the original sample set as noise samples. As a result, noise samples can be efficiently and accurately identified from the original sample set, and human resources are saved.

It can be seen from the above analysis that in some embodiments of the disclosure, the pre-trained language model can be used to perform mask prediction on the plurality of target training corpora in the target sample set, and then the first mask prediction character corresponding to each target training corpus is used to identify noisy samples in the original sample set. In a possible implementation, the pre-trained language model may be obtained by training a masked pre-trained language model by using a plurality of target training corpora in the target sample set. In view of the above situation, the method for identifying noise samples provided by the disclosure will be further described below with reference to FIG. 2.

Figure 2:
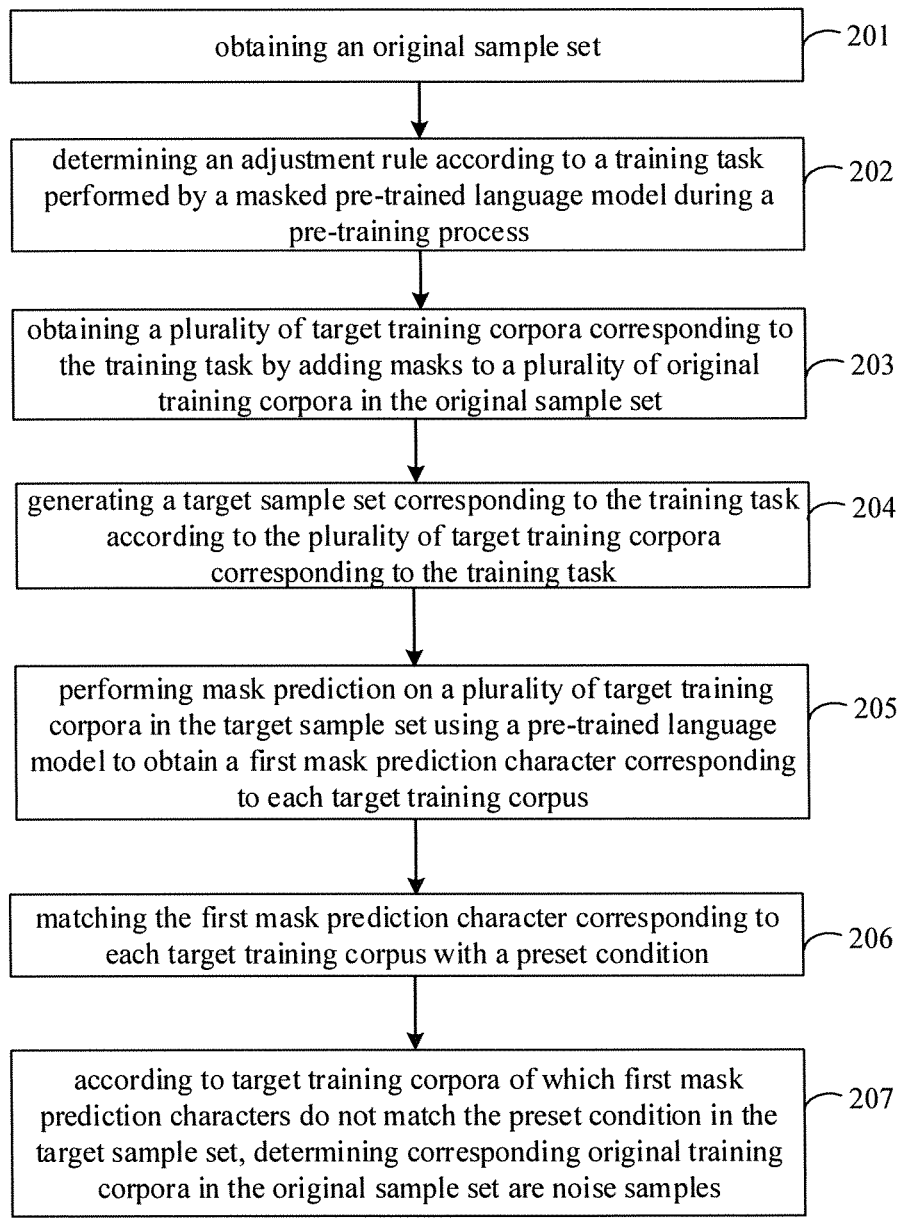
FIG. 2 is a flowchart of a method for identifying noise samples according to a second embodiment of the disclosure.

FIG. 2 is a flowchart of a method for identifying noise samples according to a second embodiment of the disclosure. As shown in FIG. 2, the method for identifying noise samples may include the following steps.

In step 201, an original sample set is obtained.

The original sample set is a training sample set from which noise samples need to be identified, including a plurality of original training corpora, and each original training corpus has a corresponding label.

The label corresponding to each original training corpus is related to the task type of the training task when the model is trained based on the original sample set. For example, when the training task is a noun phrase classification task, the label corresponding to the original training corpus can be the category label to which the noun phrase in the original training corpus belongs; when the training task is a translation task, the label corresponding to the original training corpus can be the translation result label corresponding to the original training corpus, and the like, which are not limited in this disclosure.

In step 202, an adjustment rule is determined according to a training task performed by a masked pre-trained language model during a pre-training process.

The masked pre-trained language model refers to a pre-trained language model where a training task (i.e., a pre-trained task) in the pre-training process is prediction by using a mask prediction manner. The pre-trained language model herein refers to a language model obtained by using large-scale unsupervised corpus training. The masked pre-trained language model may be a pre-trained language model of any structure or type that uses mask prediction in the pre-training process. For example, the masked pre-trained language model may be BERT (Bidirectional Encoder Representations from Transformers), ROBERTa (A Robustly Optimized BERT), ERNIE (BERT-CHINESE, WWM-BERT-CHINESE) and other models, which are not limited in this disclosure.

It can be understood that when using the plurality of target training corpora in the target sample set to train the masked pre-trained language model to obtain the pre-trained language model, the training task performed by the masked pre-trained language model in the pre-training process is the training task in the process of training the masked pre-trained language model to obtain the pre-trained language model. Correspondingly, the adjustment rule may be determined according to the training task performed by the masked pre-trained language model during the pre-training process.

In step 203, a plurality of target training corpora corresponding to the training task are obtained by adding masks to a plurality of original training corpora in the original sample set.

In step 204, a target sample set corresponding to the training task is generated according to the plurality of target training corpora corresponding to the training task.

In some embodiments, after the adjustment rule is determined according to the training task performed by the masked pre-trained language model during the pre-training process, the plurality of target training corpora corresponding to the training task are obtained by adding the masks to the plurality of original training corpora in the original sample set, and the target sample set corresponding to the training task is generated according to the plurality of target training corpora corresponding to the training task, in which the target sample set includes the plurality of target training corpora. Therefore, adding the masks to the original training corpora in the original sample set is realized to obtain the target sample set corresponding to the training task performed by the masked pre-trained language model in the pre-training process.

In some embodiments, when the training task performed by the masked pre-trained language model in the pre-training process is a text classification task, the adjustment rule may include: for each original training corpus, splicing the original training corpus and a first category label mask through a first associated word to obtain a target training corpus corresponding to the training task; in which, the first category label mask indicates that a corresponding position is predicted as a category corresponding to the original training corpus; or for each original training corpus, splicing the original training corpus and a spliced text to obtain a target training corpus corresponding to the training task; in which, the spliced text is obtaining by splicing a text segment in the original training corpus and a second category label mask through a second associated word, and the second category label mask indicates that a corresponding position is predicted as a category corresponding to the text segment.

In some embodiments, when the text classification task is specifically a noun phrase classification task, the adjustment rule may be: for each original training corpus, splicing the original training corpus and the first category label mask through the first associated word to obtain the target training corpus corresponding to the training task. The first associated word can be set as required.

The adjustment rule and the process of adding the mask to the original training corpus according to the adjustment rule will be described below with reference to specific examples.

For example, it is supposed that an original training corpus is "ABC Science Park", where "ABC" represents a name of a science park, the training task performed by the masked pre-trained language model during the pre-training process is the noun phrase classification task, and the rule is splicing the original training corpus and the first category label mask through the first associated word. According to the natural distribution of the text, in the sentence pattern in which the noun phrase is associated with the category, "is/are" is an important association factor, so the first associated word can be set as "is/are".

For the original training corpus "ABC Science Park", using this adjustment rule, "ABC Science Park" and the first category label mask "[mask][mask]" can be spliced through the first associated word "is" to obtain the target training corpus "ABC Science Park is [mask][mask]" corresponds to the original training corpus "ABC Science Park", and the style of the target training corpus is the same as the style of the input corpus in the pre-training process of the masked pre-trained language model.

In some embodiments, when the text classification task is specifically a named entity recognition task, the adjustment rule may be: for each original training corpus, splicing the original training corpus and the spliced text to obtain the target training corpus corresponding to the training task; in which the spliced text is obtaining by splicing the text segment in the original training corpus and the second category label mask through the second associated word. The text segment is a segment in the original training corpus that needs to be recognized for the named entity, and the second associated word can be set as required.

The adjustment rule and the process of adding the mask to the original training corpus according to the adjustment rule will be described below with reference to specific examples.

For example, it is supposed that an original training corpus is "Speaker of D confirmed the news on the same day", the text segment that needs to be recognized for the named entity is "D", "D" represents a name of an organization, the training task performed by the masked pre-trained language model in the pre-training process is the named entity recognition task, and the adjustment rule is to splice the original training corpus and the spliced text to obtain the target training corpus corresponding to the training task. The spliced text is obtained by splicing the text segment of the original training corpus and the second category label mask through the second associated word. Since "is/are" is an important association factor in the sentence pattern associated with entities and categories according to the natural distribution of the text, the second associated word can be set as "is/are".

For the original training corpus "Speaker of D confirmed the news on the same day", this adjustment rule is used, the text segment "D" and the second category label mask "[mask][mask][mask][mask]" can be spliced through the second correlative word "is/are" to obtain the spliced text, and then the original training corpus is spliced with the spliced text to obtain the target training corpus "Speaker of D confirmed the news on the same day, D is [mask][mask][mask][mask]" corresponding to the original training corpus "Speaker of D confirmed the news on the same day", and the style of the target training corpus is the same as the style of the input corpus in the pre-training process of the masked pre-trained language model. It should be noted that in the target training corpus, a punctuation can also be added as needed, such as "," in the target training corpus of this example.

When the training task performed by the masked pre-trained language model during the pre-training process is the text classification task, the above adjustment rule is determined, so that the masks can be added to the original training corpora in the original sample set according to the above adjustment rule to obtain the target sample set corresponding to the classification task.

In step 205, mask prediction is performed on a plurality of target training corpora in the target sample set using a pre-trained language model to obtain a first mask prediction character corresponding to each target training corpus.

The pre-trained language model is obtained by using a plurality of target training corpora in the target sample set to train the masked pre-trained language model. In the training process, the target training corpus in the target sample set is used as the input of the masked pre-trained language model, and the label of the original training corpus corresponding to the target training corpus is used as the output of the masked pre-trained language model. The masked pre-trained language model is iteratively supervised and trained to obtain the pre-trained language model. The specific process of obtaining the pre-trained language model will be described in the following embodiments, and will not be repeated herein.

In some embodiments, the plurality of target training corpora in the target sample set can be respectively input into the pre-trained language model to perform mask prediction, that is, the positions corresponding to the masks in the plurality of target training corpora can be predicted to obtain the first mask prediction character corresponding to each target training corpus. The first mask prediction character is the prediction result of the position corresponding to the mask. It should be noted that when the position corresponding to the mask is predicted, the prediction result is related to the task type of the training task of the pre-trained language model. For example, when the task type of the training task of the pre-trained language model is a text classification task, the prediction of the position corresponding to the mask is specifically to predict the position corresponding to the mask as the correct category; when the task type is a translation task, predicting the position corresponding to the mask is specifically predicting the position corresponding to the mask as the correct translation result.

For example, taking the text classification task as an example, it continues the above example, the training task performed by the masked pre-trained language model in the pre-training process and the training task of the pre-trained language model in the training process are specifically the noun phrase classification task. When the original training corpus is "ABC Science Park", the obtained target training corpus is "ABC Science Park is [mask][mask]", and the target training corpus is input into the pre-trained language model for mask prediction to obtain "ABC Science Park is a place", where "place" is the first mask prediction character corresponding to the target training corpus "ABC Science Park is [mask][mask]".

When the training task performed by the masked pre-trained language model in the pre-training process and the training task of the pre-trained language model in the training process are specifically the named entity recognition task, for the original training corpus "Speaker of D confirmed the news on the same day", the obtained target training corpus is "Speaker of D confirmed the news on the same day, D is [mask][mask][mask][mask]", and is input into the pre-trained language model for mask prediction to obtain "Speaker of D confirmed the news on the same day, D is the organization", where "organization" is the first mask prediction character of the target training corpus "Speaker of D confirmed the news on the same day, Dis [mask][mask][mask][mask]".

According to the training task performed by the masked pre-trained language model in the pre-training process, the adjustment rule is determined, and the masks are added to the original training corpora in the original sample set by using the adjustment rule to obtain the target sample set. The original training corpus in the sample set is transformed into the task type of the training task performed by the masked pre-trained language model during the pre-training process. And because the pre-trained language model is obtained by training the masked pre-trained language model using the plurality of target training corpora in the target sample set, the pre-trained language model can make full use of the statistical co-occurrence knowledge learned by the masked pre-trained language model in the pre-training process for mask prediction. Since the pre-trained corpus of the masked pre-trained language model in the pre-training process has directly covered most of the task data, the pre-trained language model is relatively sensitive to the distribution of the data. If there are noise samples such as inconsistency in the labels of the original sample set or sample confusion, it will directly and significantly affect the performance of the language model, so that it is more convenient to obtain the distribution of the noise samples in the original sample set, and it is more convenient to identify the noise samples from the original sample set.

In step 206, the first mask prediction character corresponding to each target training corpus is matched with a preset condition.

In step 207, according to target training corpora of which first mask prediction characters do not match the preset condition in the target sample set, corresponding original training corpora in the original sample set are determined are noise samples.

For the specific implementation process and principle of the above steps 206-207, reference may be made to the description in the above embodiments, and details are not repeated herein.

In conclusion, the method for identifying noise samples provided by embodiments of the disclosure obtains the original sample set, determines the adjustment rule according to the training task performed by the masked pre-trained language model during the pre-training process, obtains the plurality of target training corpora corresponding to the training task by adding the masks to the plurality of original training corpora in the original sample set by using the adjustment rule, generates the target sample set corresponding to the training task according to the plurality of target training corpora corresponding to the training task, performs mask prediction on the plurality of target training corpora in the target sample set using the pre-trained language model to obtain the first mask prediction character corresponding to each target training corpus, matches the first mask prediction character corresponding to each target training corpus with the preset condition, and according to the target training corpora of which first mask prediction characters do not match the preset condition in the target sample set, determines the corresponding original training corpora in the original sample set as the noise samples. As a result, noise samples can be efficiently and accurately identified from the original sample set, and human resources are saved.

It can be seen from the above analysis that in some embodiments of the disclosure, after obtaining the first mask prediction character corresponding to each target training corpus, the first mask prediction character can be matched with the preset condition, and according to the target training corpora of which first mask prediction characters do not match the preset condition in the target sample set, the corresponding original training corpora in the original sample set are determined are the noise samples. In the following, in conjunction with FIG. 3, the first mask prediction character indicates the prediction category corresponding to the target training corpus as an example, in the method for identifying noise samples provided by the disclosure, the process of determining noise samples in the original sample set according to the first mask prediction character corresponding to each target training corpus is further described.

Figure 3:
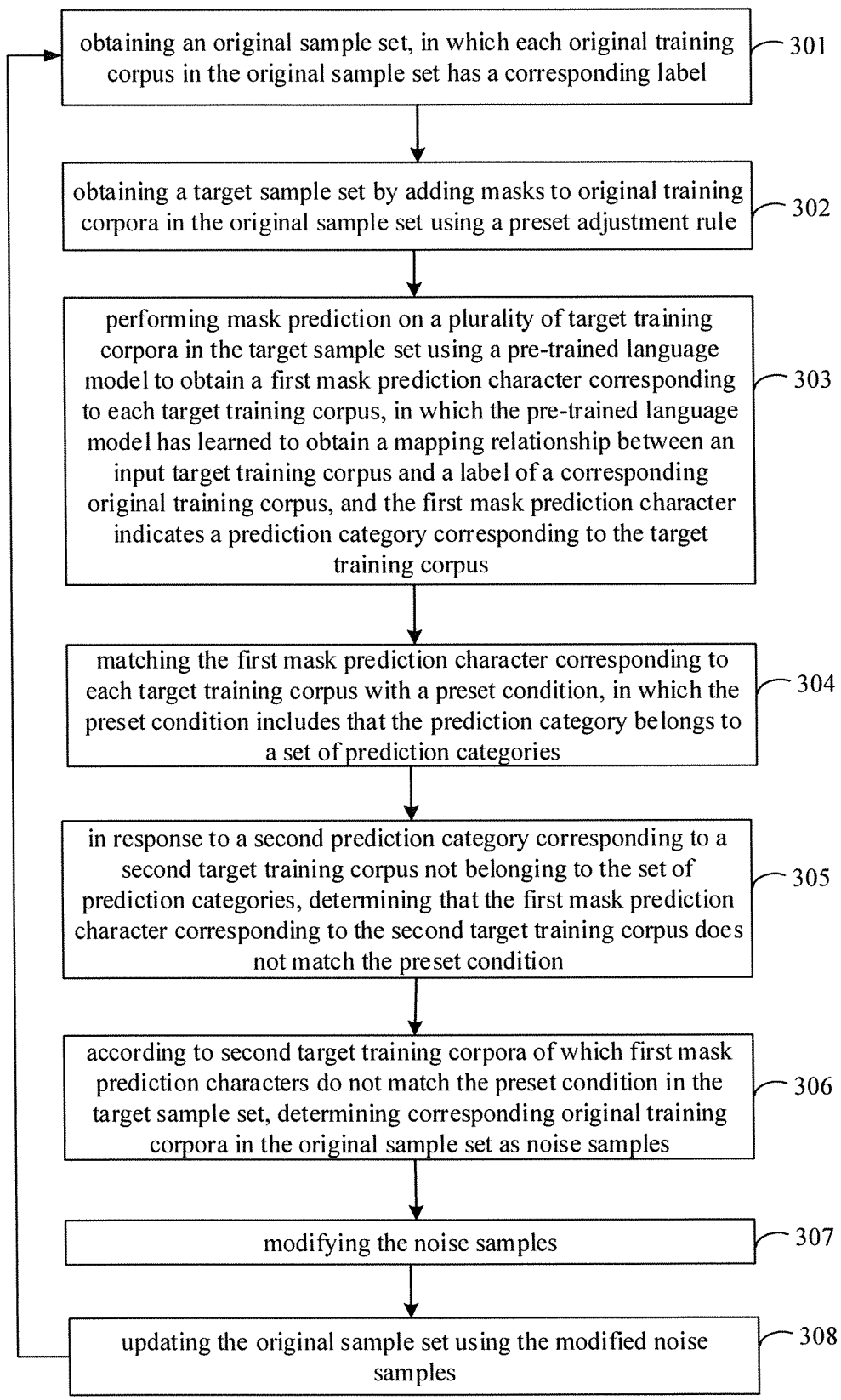
FIG. 3 is a flowchart of a method for identifying noise samples according to a third embodiment of the disclosure.

FIG. 3 is a flowchart of a method for identifying noise samples according to a third embodiment of the disclosure. As shown in FIG. 3, the method for identifying noise samples may include the following steps.

In step 301, an original sample set is obtained, in which each original training corpus in the original sample set has a corresponding label.

In step 302, a target sample set is obtained by adding masks to original training corpora in the original sample set using a preset adjustment rule.

In step 303, mask prediction is performed on a plurality of target training corpora in the target sample set using a pre-trained language model to obtain a first mask prediction character corresponding to each target training corpus. The pre-trained language model has learned to obtain a mapping relationship between an input target training corpus and a label of a corresponding original training corpus. The first mask prediction character indicates a prediction category corresponding to the target training corpus.

In some embodiments, during the training process, the target training corpus in the target sample set is used as the input of the initial language model, and the label of the original training corpus corresponding to the target training corpus is used as the output of the initial language model. The pre-trained language model can be obtained by iteratively supervised training the initial language model, and the pre-trained language model has learned the mapping relationship between the input target training corpus and the label of the corresponding original training corpus. The specific process of obtaining the pre-trained language model will be described in the following embodiments, and will not be repeated herein.

In some embodiments, the pre-trained language model may be obtained by using the plurality of target training corpora in the target sample set to train the masked pre-trained language model. Correspondingly, the adjustment rule may be determined based on the training task performed by the masked pre-trained language model during the pre-training process. That is, before step 302, the method may further include: determining the adjustment rule according to the training task performed by the masked pre-trained language model in the pre-training process.

It should be noted that the masked pre-trained language model in some embodiments of the disclosure may be a self-encoding pre-trained language model, such as BERT, ROBERTa, ERNIE, or a non-self-encoding pre-trained language model, such as an auto-regressive pre-trained language model, which is not limited in this disclosure. When the masked pre-trained language model is the self-encoding pre-trained language model, since the self-encoding pre-trained language model is to calculate the association between the position corresponding to the [mask] mask and all other positions, the reasonableness of the sentence of the prompt learning task can be ignored.

For the specific implementation process and principles of steps 301-303, reference may be made to the descriptions of the foregoing embodiments, which will not be repeated herein.

In step 304, the first mask prediction character corresponding to each target training corpus is matched with a preset condition. The preset condition includes that the prediction category belongs to a set of prediction categories.

In step 305, in response to a second prediction category corresponding to a second target training corpus not belonging to the set of prediction categories, it is determined that the first mask prediction character corresponding to the second target training corpus does not match the preset condition.

The set of prediction categories may be determined in advance according to each prediction category that may correspond to the target training corpus when the target training corpus is a non-noise sample. The second target training corpus is the target training corpus in the target sample set, and the second prediction category is the prediction category corresponding to the target training corpus indicated by the first mask prediction character corresponding to the second target training corpus.

In some embodiments, when the first mask prediction character indicates the prediction category corresponding to the target training corpus, and the preset condition includes that the prediction category belongs to the set of prediction categories, the first mask prediction character corresponding to each target training corpus is compared with the preset condition, which can be understood as judging whether the prediction category corresponding to each target training corpus belongs to the set of prediction categories. In some embodiments, if the second prediction category corresponding to the second target training corpus in the target sample set does not belong to the set of prediction categories, it may be determined that the first mask prediction character corresponding to the second target training corpus does not match the preset condition; if the first prediction category corresponding to the first target training corpus belongs to the set of prediction categories, it may be determined that the first mask prediction character corresponding to the first target training corpus matches the preset condition. The first target training corpus is the target training corpus in the target sample set, and the first prediction category is the prediction category corresponding to the target training corpus indicated by the first mask prediction character corresponding to the first target training corpus.

In step 306, according to second target training corpora of which first mask prediction characters do not match the preset condition in the target sample set, corresponding original training corpora in the original sample set are determined as noise samples.

In some embodiments, when the first mask prediction character corresponding to the second target training corpus in the target sample set does not match the preset condition, that is, when the prediction category corresponding to the second target training corpus does not belong to the set of prediction categories, it means that the pre-trained language model is confused in each prediction category in the set of prediction categories. The specific manifestation may be that the original training corpus corresponding to the second target training corpus is not marked as the category to which it belongs, but is marked as other categories, resulting in the inconsistency on the label of each original training corpus, so that it can be determined that the original training corpus corresponding to the second target training corpus in the original sample set is a noise sample.

For example, the pre-trained language model is obtained by using the plurality of target training corpora in the target sample set to train the masked pre-trained language model, and the training task performed by the masked pre-trained language model during the pre-training process and the training task of the pre-trained language model in the training process are the noun phrase classification task. It is assumed that the set of prediction categories includes "biological virus" and "term" categories, and the pre-trained language model is used to perform mask prediction on a certain target training corpus in the target training set to obtain the first mask prediction character corresponding to the certain target training corpus being "artificial disease", that is, the certain target training corpus belongs to the category of "artificial disease". Since the "artificial disease" category does not belong to the set of prediction categories, it shows that the pre-trained language model is confused in the prediction of two categories of "biological virus" and "term", and the specific manifestation may be that the original training corpus belonging to the "biological virus" category is marked as the "term" category, which leads to inconsistencies in the label of each original training corpus, so that the original training corpus corresponding to the target training corpus of which the first mask prediction character is "artificial disease" is determined as the noise sample.

Since the pre-trained language model has learned the mapping relationship between the input target training corpus and the label of the corresponding original training corpus, the text information in the target training corpus is fully utilized in the learning process, and the task type of the training task of the pre-trained language model (that is, prediction by the mask prediction manner) is more sensitive to noise samples. If the input corpus of the pre-trained language model is a noise sample, it will directly and significantly affect the performance of the language model. Therefore, the language model performs mask prediction on the plurality of target training corpora in the target sample set, which can realize the accurate identification of noise samples according to prediction results. And the prediction category corresponding to the target training corpus is indicated through the first mask prediction character, and according to whether the corresponding prediction category belongs to the set of prediction categories, it is determined whether the first mask prediction character corresponding to the target training corpus matches the preset condition, and then the original training corpus corresponding to the target training corpus of which the corresponding first mask prediction character does not match the preset condition is determined as the noise sample, which realizes the use of the pre-trained language model to predict the prediction category corresponding to the target training corpus and accurately identify the noise samples in the original sample set according to uncontrollable results of the mask prediction of the language model.

In step 307, the noise samples are modified.

In step 308, the original sample set is updated using the modified noise samples.

In some embodiments, after the noise samples in the original sample set are determined, the noise samples can be modified, and the original sample set can be updated with the modified noise samples. As shown in FIG. 3, after updating the original sample set, the preset adjustment rule can be used to add the masks to the original training corpora in the updated original sample set to obtain the updated target sample set, and it can continue to use the updated target sample set to learn the language model and identify the noise samples in the original sample set. After the noise samples are identified, the original sample set can be further revised and updated.

Take the pre-trained language model that is obtained by using the plurality of target training corpora in the target sample set to train the masked pre-trained language model as an example. After obtaining the original sample set, the adjustment rule is determined according to the training task performed by the masked pre-trained language model in the pre-training process. The target sample set is obtained by the adding masks to the original training corpora in the original sample set using the preset adjustment rule. The plurality of target training corpora in the target sample set are used to train the masked pre-trained language model to obtain the pre-trained language model. Then, mask prediction is performed on the plurality of target training corpora in the target sample set using the pre-trained language model to obtain the first mask prediction character corresponding to each target training corpus, and the first mask prediction character indicates the prediction category corresponding to the target training corpus. The first mask prediction character corresponding to each target training corpus is matched with the preset condition, and according to the second target training corpora of which first mask prediction characters do not match the preset condition in the target sample set, corresponding original training corpora in the original sample set are determined as the noise samples. The noise samples can be modified, and the original sample set can be updated with the modified noise samples. The updated original sample set can continue to be used to train the pre-trained language model, and then the further trained language model can be used to further identify the noise samples in the original sample set, and the original sample set can be further corrected and updated after the noise samples are identified.

In this way, the language model can be iteratively trained, and the language model after iterative training can be continuously used to identify noise samples until the language model that satisfies requirements is obtained. The language model at this time can be used for downstream applications, and the original sample set at this time may include a very few noisy samples, and the quality of the original sample set is improved. The requirements that the language model satisfies can be determined according to requirements of downstream applications, which are not limited in the disclosure.

In conclusion, the method for identifying noise samples according to embodiments of the disclosure obtains the original sample set, in which each original training corpus in the original sample set has the corresponding label, obtains the target sample set by adding the masks to the original training corpora in the original sample set using the preset adjustment rule, performs mask prediction on the plurality of target training corpora in the target sample set using the pre-trained language model to obtain the first mask prediction character corresponding to each target training corpus, in which the pre-trained language model has learned the mapping relationship between the input target training corpus and the label of the corresponding original training corpus, and the first mask prediction character indicates the prediction category corresponding to the target training corpus, matches the first mask prediction character corresponding to each target training corpus with the preset condition, in which the preset condition includes that the prediction category belongs to the set of prediction categories, determines that the first mask prediction character corresponding to the second target training corpus does not match the preset condition in response to the second prediction category corresponding to the second target training corpus not belonging to the set of prediction categories, determines corresponding original training corpora in the original sample set as the noise samples according to second target training corpora of which first mask prediction characters do not match the preset condition in the target sample set, modifies the noise samples, and updates the original sample set using the modified noise samples, which can efficiently and accurately identify the noise samples from the original sample set, and saves human resources.

According to some embodiments of the disclosure, the disclosure also provides a method for training a model for identifying noise samples. The following describes the method for training a model for identifying noise samples provided by the disclosure in detail with reference to FIG. 4.

Figure 4:
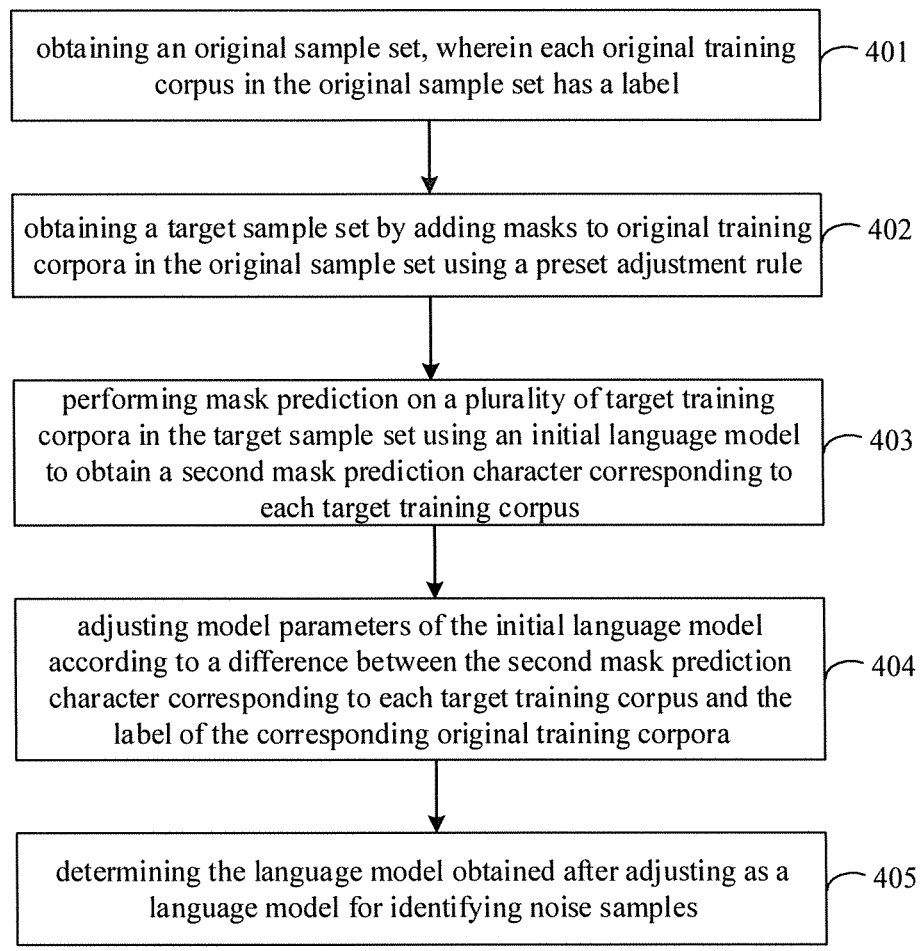
FIG. 4 is a flowchart of a method for training a model for identifying noise samples according to a fourth embodiment of the disclosure.

FIG. 4 is a flowchart of a method for training a model for identifying noise samples according to a fourth embodiment of the disclosure. It should be noted that the method for training a model for identifying noise samples provided by some embodiments of the disclosure is performed by an apparatus for training a model for identifying noise samples. The apparatus for training a model for identifying noise samples may specifically be an electronic device, or software configured in the electronic device, or the like, so as to obtain a language model for identifying noise samples by training. The embodiments of the disclosure are described by taking as an example that the apparatus for training a model for identifying noise samples is configured in the electronic device.

As shown in FIG. 4, the method for training a model for identifying noise samples may include the following steps.

In step 401, an original sample set is obtained, in which each original training corpus in the original sample set has a corresponding label.

In step 402, a target sample set is obtained by adding masks to original training corpora in the original sample set using a preset adjustment rule.

For the specific implementation process and principles of steps 401-402, reference may be made to the description in the above-mentioned embodiments of the method for identifying noise samples, which will not be repeated herein.

In step 403, mask prediction is performed on a plurality of target training corpora in the target sample set using an initial language model to obtain a second mask prediction character corresponding to each target training corpus.

The adjustment rule refer to the rule on which the original training corpora in the original sample set are adjusted to obtain the target sample set. The preset adjustment rule is determined according to the task type of the training task of the initial language model. The task type of the training task of the initial language model can be understood as the style of the input corpus of the language model in the process of obtaining the initial language model through training. The adjustment rule is used to mask the original training corpora in the original sample set, and the obtained target training corpus in the target sample set has the same style as the input corpus of the language model in the process of training to obtain the initial language model.

The initial language model may be a neural network model of any type or structure, which is not limited in the disclosure.

In some embodiments, the training task of the initial language model may be a prompt learning task, and correspondingly, the task type of the training task may be the input corpus including the [mask] mask, and the training target of the training task is to predict the position corresponding to the [mask] mask. It should be noted that when predicting the position corresponding to the mask, the prediction result is related to the task type of the training task of the initial language model. For example, when the task type of the training task of the initial language model is a text classification task, predicting the position corresponding to the mask is specifically predicting the position corresponding to the mask as the correct category; when the task type of the training task of the initial language model is a translation task, predicting the position corresponding to the mask is specifically predicting the position corresponding to the mask as the correct translation result.

Correspondingly, in some embodiments of the disclosure, the preset adjustment rule can be used to add the masks to the original training corpora in the original sample set to obtain the target sample set, and the target sample set includes the plurality of target training corpora, and then the plurality of target training corpora in the target sample set are input into the initial language model, and the mask prediction is performed, that is, the positions corresponding to the masks in the plurality of target training corpora are predicted, and the second mask prediction character corresponding to each target training corpus is obtained. The second mask prediction character is the prediction result of the position corresponding to the mask.

For example, it is assumed that the original training corpus is "ABC Science Park", the training task of the initial language model is the prompt learning task, the task type is the noun phrase classification task, and the adjustment rule is to splice the original training corpus and the category label mask through the associated word "is/are" to obtain the target training corpus, in which the category label mask indicates that the corresponding position is predicted to be the category corresponding to the original training corpus. Then, using this adjustment rule, the [mask] mask is added to the original training corpus to obtain the target training corpus "ABC Science Park is [mask][mask]", and the target training corpus is input into the initial language model for mask prediction to obtain "ABC Science Park is a place", where "place" is the second mask prediction character corresponding to the target training corpus "ABC Science Park is [mask][mask]".

In step 404, model parameters of the initial language model are adjusted according to a difference between the second mask prediction character corresponding to each target training corpus and the label of the corresponding original training corpora.

In step 405, the language model obtained after adjusting is determined as a language model for identifying noise samples.

In some embodiments, the initial language model can be trained by means of deep learning to obtain the language model for identifying noise samples. Compared with other machine learning manners, deep learning performs better on large data sets.

When training the initial language model through deep learning, one or more target training corpora in the target sample set can be used as input to input into the initial language model to perform mask prediction on the one or more target training corpora to obtain the second mask prediction character corresponding to each target training corpus, and combined with the label of the original training corpus corresponding to the target training corpus, the difference between the second mask prediction character corresponding to the target training corpus and the corresponding label of the original training corpus is obtained, to adjust the model parameters of the initial language model according to the difference to obtain the adjusted language model. Then one or more target training corpora in the target sample set can be used as input to input into the initial language model to perform mask prediction on the one or more target training corpora to obtain the second mask prediction character corresponding to each target training corpus, and combined with the label of the original training corpus corresponding to the target training corpus, the difference between the second mask prediction character corresponding to the target training corpus and the corresponding label of the original training corpus is obtained, to adjust the model parameters of the initial language model according to the difference to obtain the further adjusted language model. Thus, the initial language model is iteratively trained by continuously adjusting the model parameters of the initial language model, until the accuracy of the second mask prediction character corresponding to the obtained target training corpus satisfies the preset threshold, and the training ends. A final adjusted language model is obtained, and the adjusted language model has learned the mapping relationship between the target training corpus and the label corresponding to the original training corpus.

The language model obtained after adjusting can be used as the language model for identifying noise samples, and performs mask prediction on the plurality of target training corpora in the target sample set, so as to obtain the first mask prediction character corresponding to each target training corpus, then match the first mask prediction character corresponding to each target training corpus with the preset condition, and determine the corresponding original training corpus in the original sample set according to the target training corpus of which the first mask prediction character in the target sample set does not match the preset condition as the noise sample.

Thus, based on the initial language model and the target sample set whose task type is the same as the task type of the training task of the initial language model, the language model for identifying noise samples is obtained by training. Since the language model learns the mapping relationship between the target training corpus and the label corresponding to the original training corpus during the training process, the text information in the target training corpus is fully utilized in the learning process, and the task type of the training task of the language model (i.e. prediction by the mask prediction manner) is more sensitive to noise samples. If the input corpus of the language model used for identifying noise samples is the noise sample, it will directly and significantly affect the performance of the language model. The noise samples in the original sample set are accurately identified by the language model obtained after training. Since the language model used for identifying noise samples can replace the manual identification of noise samples on a large number of original training corpora, the noise sample identification efficiency can be improved and human resources can be saved.

In conclusion, the method for training a model for identifying noise samples provided by embodiments of the disclosure obtains an original sample set, in which each original training corpus in the original sample set has a corresponding label, obtains a target sample set by adding masks to original training corpora in the original sample set using a preset adjustment rule, performs mask prediction on a plurality of target training corpora in the target sample set using an initial language model to obtain a second mask prediction character corresponding to each target training corpus, adjusts model parameters of the initial language model according to a difference between the second mask prediction character corresponding to each target training corpus and the label of the corresponding original training corpora, and determines the language model obtained after adjusting as a language model for identifying noise samples, which realizes the training of the initial language model, and obtains a language model that can efficiently and accurately identify noise samples and save human resources.

It can be seen from the above analysis that in some embodiments of the disclosure, the language model for identifying noise samples can be obtained by training the initial language model. In one possible implementation, the initial language model may be a masked pre-trained language model. In view of the above situation, the method for training a model for identifying noise samples provided by the disclosure will be further described with reference to FIG. 5.

Figure 5:
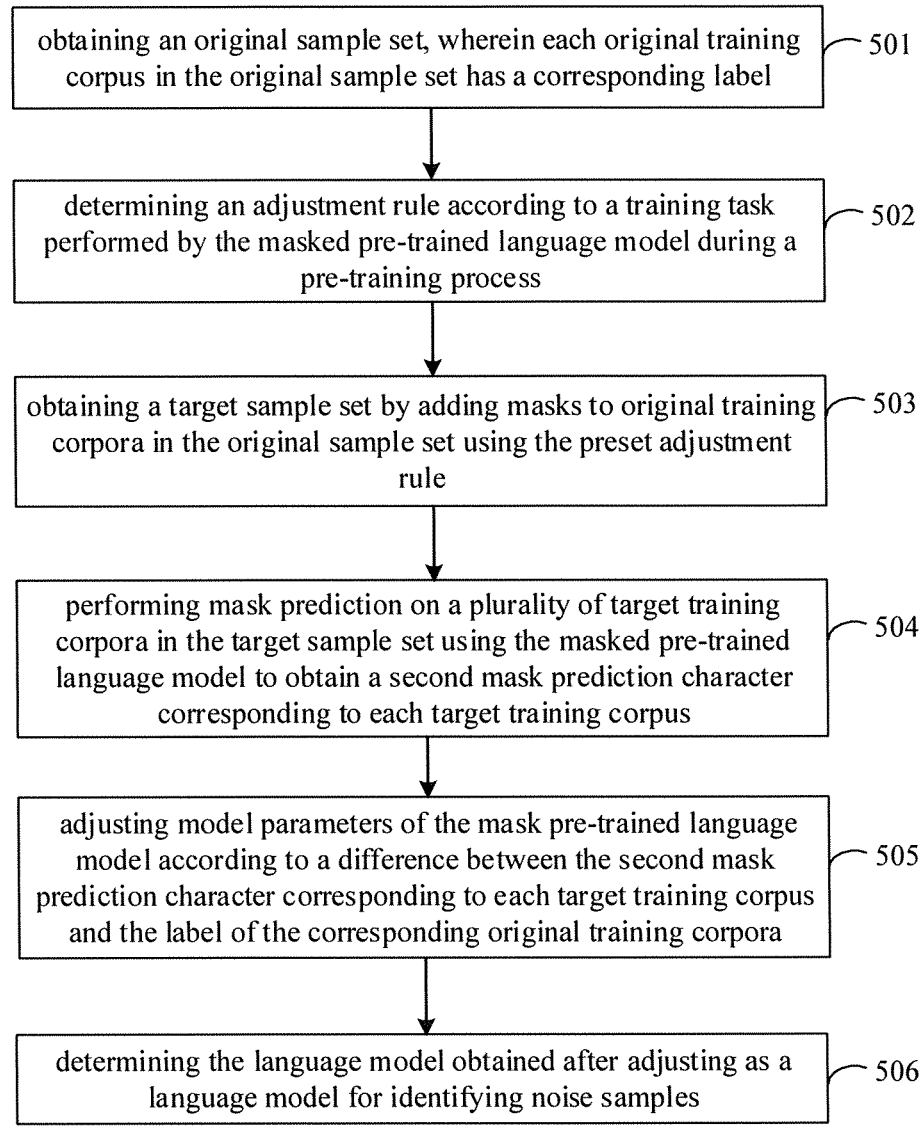
FIG. 5 is a flowchart of a method for training a model for identifying noise samples according to a fifth embodiment of the disclosure.

FIG. 5 is a flowchart of a method for training a model for identifying noise samples according to a fifth embodiment of the disclosure. As shown in FIG. 5, the method for training a model for identifying noise samples may include the following steps.

In step 501, an original sample set is obtained, in which each original training corpus in the original sample set has a corresponding label.

In step 502, an adjustment rule is determined according to a training task performed by the masked pre-trained language model during a pre-training process.

The masked pre-trained language model refers to a pre-trained language model where a training task (i.e., a pre-trained task) in the pre-training process is prediction by using a mask prediction manner. The pre-trained language model herein refers to a language model obtained by using large-scale unsupervised corpus training. The masked pre-trained language model may be a pre-trained language model of any structure or type that uses mask prediction in the pre-training process. For example, the masked pre-trained language model may be BERT, ROBERTa, ERNIE and other models, which are not limited in this disclosure.

It can be understood that when the initial language model is the masked pre-trained language model, the training task performed by the masked pre-trained language model during the pre-training process is the training task in the process of training the masked pre-trained language model to obtain the language model for identifying noise samples. Correspondingly, the adjustment rule may be determined according to the training task performed by the masked pre-trained language model during the pre-training process.

In step 503, a target sample set is obtained by adding masks to original training corpora in the original sample set using the preset adjustment rule.

In some embodiments, after the adjustment rule is determined according to the training task performed by the masked pre-trained language model during the pre-training process, the masks can be added to the plurality of original training corpora in the original sample set according to the adjustment rule to obtain each target training corpus corresponding to the training task, and the target sample set corresponding to the training task is generated according to each target training corpus corresponding to the training task, in which the target sample set includes each target training corpus.

According to the training task performed by the masked pre-trained language model in the pre-training process, the adjustment rule is determined, and the masks are added to the original training corpora in the original sample set by using the adjustment rule to obtain the target sample set. The original training corpus in the sample set is transformed into the task type of the training task performed by the masked pre-trained language model during the pre-training process.

In some embodiments, when the training task performed by the masked pre-trained language model in the pre-training process is a text classification task, the adjustment rule may include: for each original training corpus, splicing the original training corpus and a first category label mask through a first associated word to obtain a target training corpus corresponding to the training task; in which, the first category label mask indicates that a corresponding position is predicted as a category corresponding to the original training corpus; or, for each original training corpus, splicing the original training corpus and a spliced text to obtain a target training corpus corresponding to the training task; in which, the spliced text is obtaining by splicing a text segment in the original training corpus and a second category label mask through a second associated word, and the second category label mask indicates that a corresponding position is predicted as a category corresponding to the text segment.

In step 504, mask prediction is performed on a plurality of target training corpora in the target sample set using the masked pre-trained language model to obtain a second mask prediction character corresponding to each target training corpus.

In step 505, model parameters of the masked pre-trained language model are adjusted according to a difference between the second mask prediction character corresponding to each target training corpus and the label of the corresponding original training corpora.

In step 506, the language model obtained after adjusting is determined as a language model for identifying noise samples.

For the specific implementation process and principles of steps 504-506, reference may be made to the descriptions of the foregoing embodiments, and details are not repeated herein.

In some embodiments, after the language model obtained after adjusting is determined as the language model for identifying noise samples, the language model can be used to perform mask prediction on the plurality of target training corpora in the target sample set to obtain the first mask prediction character corresponding to each target training corpus, and then match the first mask prediction character corresponding to each target training corpus with the preset condition, and determine corresponding original training corpus in the original sample set as a noise sample according to the target training corpus of which the first mask prediction character in the target sample set does not match the preset condition. In addition, after identifying the noise samples in the original sample set, the noise samples can also be modified, and the original sample set can be updated with the modified noise samples, and then the language model can be iteratively trained with the updated original sample set, and the iteratively trained language model is used to identify the noise samples until the language model that satisfies the requirements is obtained.

In conclusion, the method for training a model for identifying noise samples provided by embodiments of the disclosure obtains an original sample set, in which each original training corpus in the original sample set has a corresponding label, determines an adjustment rule according to a training task performed by a masked pre-trained language model during a pre-training process, obtains a target sample set by adding masks to original training corpora in the original sample set using the preset adjustment rule, performs mask prediction on a plurality of target training corpora in the target sample set using the masked pre-trained language model to obtain a second mask prediction character corresponding to each target training corpus, adjusts model parameters of the masked pre-trained language model according to a difference between the second mask prediction character corresponding to each target training corpus and the label of the corresponding original training corpora, and determines the language model obtained after adjusting as a language model for identifying noise samples, which realizes the training of the masked pre-trained language model, and obtains a language model that can efficiently and accurately identify noise samples and save human resources.

The apparatus for identifying noise samples provided by the disclosure will be described below with reference to FIG. 6.

Figure 6:
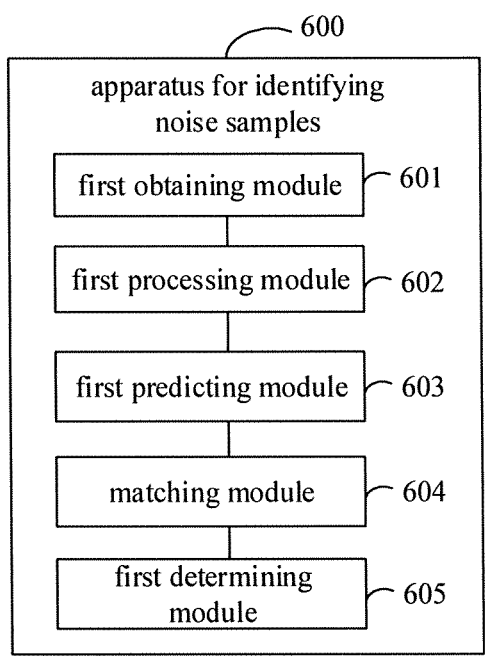
FIG. 6 is a block diagram of an apparatus for identifying noise samples according to a sixth embodiment of the disclosure.

FIG. 6 is a block diagram of an apparatus for identifying noise samples according to a sixth embodiment of the disclosure.

As shown in FIG. 6, the apparatus 600 for identifying noise samples provided by the disclosure includes a first obtaining module 601, a first processing module 602, a first predicting module 603, a matching module 604 and a first determining module 605.

The first obtaining module 601 is configured to obtain an original sample set.

The first processing module 602 is configured to obtain a target sample set by adding masks to original training corpora in the original sample set using a preset adjustment rule.

The first predicting module 603 is configured to perform mask prediction on a plurality of target training corpora in the target sample set using a pre-trained language model to obtain a first mask prediction character corresponding to each target training corpus.

The matching module 604 is configured to match the first mask prediction character corresponding to each target training corpus with a preset condition.

The first determining module 605 is configured to, according to target training corpora of which first mask prediction characters do not match the preset condition in the target sample set, determine corresponding original training corpora in the original sample set as noise samples.

It should be noted that, the apparatus for identifying noise samples provided in some embodiments can execute the method for identifying noise samples in the foregoing embodiments. The apparatus for identifying noise samples may be an electronic device or may be software configured in the electronic device, so as to efficiently and accurately identify the noise samples in the original sample set.

The electronic device can be any stationary or mobile computing device capable of data processing, such as the mobile computing device for example a notebook computer, a smart phone, and a wearable device, or the stationary computing device for example a desktop computer or a server, or other types of computing devices, which are not limited in this disclosure.

It should be noted that the foregoing description of embodiments of the method for identifying noise samples is also applicable to the apparatus for identifying noise samples provided by the disclosure, and details are not repeated herein.

The apparatus for identifying noise samples provided by embodiments of the disclosure obtains an original sample set, obtains a target sample set by adding masks to original training corpora in the original sample set using a preset adjustment rule, performs mask prediction on a plurality of target training corpora in the target sample set using a pre-trained language model to obtain a first mask prediction character corresponding to each target training corpus, matches the first mask prediction character corresponding to each target training corpus with a preset condition, and according to target training corpora of which first mask prediction characters do not match the preset condition in the target sample set, determines corresponding original training corpora in the original sample set as noise samples. As a result, noise samples can be efficiently and accurately identified from the original sample set, and human resources are saved.

The apparatus for identifying noise samples provided by the disclosure will be further described below with reference to FIG. 7.

Figure 7:
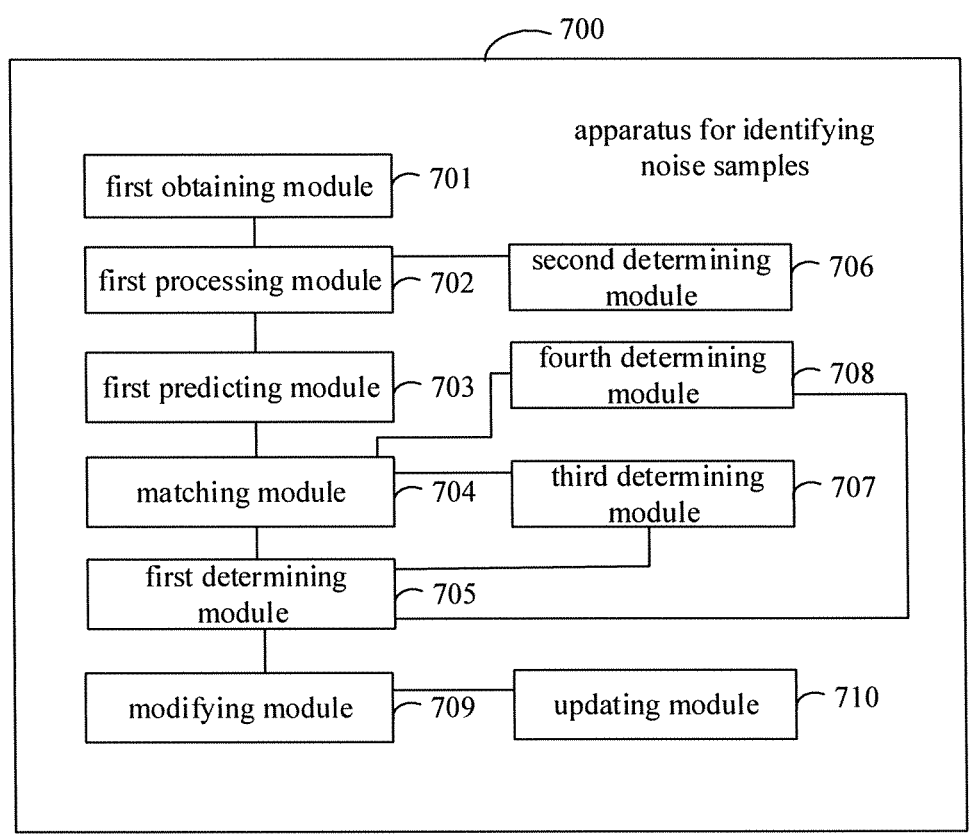
FIG. 7 is a block diagram of an apparatus for identifying noise samples according to a seventh embodiment of the disclosure.

FIG. 7 is a block diagram of an apparatus for identifying noise samples according to a seventh embodiment of the disclosure.

As shown in FIG. 7, the apparatus 700 for identifying noise samples may specifically include a first obtaining module 701, a first processing module 702, a first predicting module 703, a matching module 704 and a first determining module 705. The first obtaining module 701, the first processing module 702, the first predicting module 703, the matching module 704 and the first determining module 705 in FIG. 7 are the same as the first obtaining module 601, the first processing module 602, the first predicting module 603, the matching module 604 and the first determining module 605 in the function and structure.

In some embodiments, the pre-trained language model is obtained by training a masked pre-trained language model using a plurality of target training corpora in the target sample set.

In some embodiments, the apparatus 700 for identifying noise samples further includes a second determining module 706, configured to determine the adjustment rule according to a training task performed by the masked pre-trained language model during a pre-training process.

In some embodiments, the training task includes a text classification task; accordingly, the adjustment rule includes: for each original training corpus, splicing the original training corpus and a first category label mask through a first associated word to obtain a target training corpus corresponding to the training task; in which, the first category label mask indicates that a corresponding position is predicted as a category corresponding to the original training corpus; or, for each original training corpus, splicing the original training corpus and a spliced text to obtain a target training corpus corresponding to the training task; in which, the spliced text is obtaining by splicing a text segment in the original training corpus and a second category label mask through a second associated word, and the second category label mask indicates that a corresponding position is predicted as a category corresponding to the text segment.

In some embodiments, the first processing module 702 includes: a processing unit, configured to obtain a plurality of target training corpora corresponding to the training task by adding the masks to a plurality of original training corpora in the original sample set; and a generating unit, configured to generate the target sample set corresponding to the training task according to the plurality of target training corpora corresponding to the training task.

In some embodiments, each original training corpus in the original sample set has a label; and the pre-trained language model has learned to obtain a mapping relationship between an input target training corpus and a label of a corresponding original training corpus.

In some embodiments, the first mask prediction character indicates a prediction category corresponding to the target training corpus, and the preset condition includes that the prediction category belongs to a set of prediction categories; and the apparatus 700 further: a third determining module 707, configured to, in response to a first prediction category corresponding to a first target training corpus belonging to the set of prediction categories, determine that the first mask prediction character corresponding to the first target training corpus matches the preset condition; and a fourth determining module 708, configured to, in response to a second prediction category corresponding to a second target training corpus not belonging to the set of prediction categories, determine that the first mask prediction character corresponding to the second target training corpus does not match the preset condition.

In some embodiments, the apparatus 700 further includes: a modifying module 709, configured to modify the noise samples; and an updating module 710, configured to update the original sample set using the modified noise samples.

It should be noted that the foregoing description of embodiments of the method for identifying noise samples is also applicable to the apparatus for identifying noise samples provided by the disclosure, and details are not repeated herein.

The apparatus for identifying noise samples provided by embodiments of the disclosure obtains an original sample set, obtains a target sample set by adding masks to original training corpora in the original sample set using a preset adjustment rule, performs mask prediction on a plurality of target training corpora in the target sample set using a pre-trained language model to obtain a first mask prediction character corresponding to each target training corpus, matches the first mask prediction character corresponding to each target training corpus with a preset condition, and according to target training corpora of which first mask prediction characters do not match the preset condition in the target sample set, determines corresponding original training corpora in the original sample set as noise samples. As a result, noise samples can be efficiently and accurately identified from the original sample set, and human resources are saved.

Figure 8:
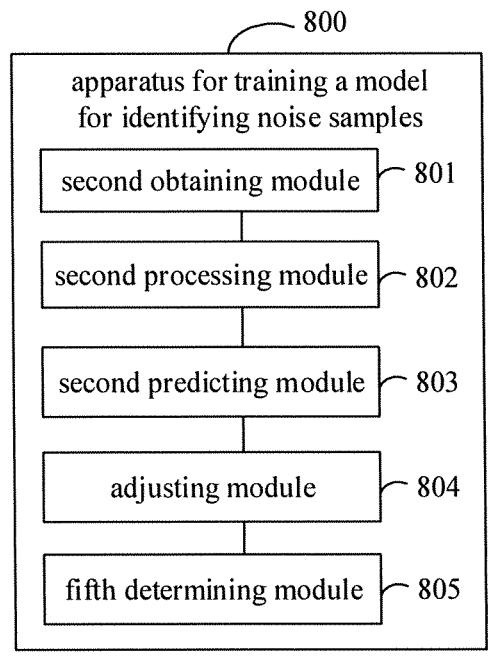
FIG. 8 is a block diagram of an apparatus for training a model for identifying noise samples according to an eighth embodiment of the disclosure.

The following describes an apparatus for training a model for identifying noise samples provided by the disclosure with reference to FIG. 8.

FIG. 8 is a block diagram of an apparatus for training a model for identifying noise samples according to an eighth embodiment of the disclosure.

As shown in FIG. 8, the apparatus 800 for training a model for identifying noise samples includes a second obtaining module 801, a second processing module 802, a second predicting module 803, an adjusting module 804 and a fifth determining module 805.

The second obtaining module 801 is configured to obtain an original sample set, in which each original training corpus in the original sample set has a label.

The second processing module 802 is configured to obtain a target sample set by adding masks to original training corpora in the original sample set using a preset adjustment rule.

The second predicting module 803 is configured to perform mask prediction on a plurality of target training corpora in the target sample set using an initial language model to obtain a second mask prediction character corresponding to each target training corpus.

The adjusting module 804 is configured to adjust model parameters of the initial language model according to a difference between the second mask prediction character corresponding to each target training corpus and the label of the corresponding original training corpora.

The fifth determining module 805 is configured to determine the language model obtained after adjusting as a language model for identifying noise samples.

It should be noted that, the apparatus for training a model for identifying noise samples provided in some embodiments can execute the method for training a model for identifying noise samples in the foregoing embodiments. The apparatus for training a model for identifying noise samples may be an electronic device or may be software configured on the electronic device, so as to obtain a language model for identifying noise samples by training.

The electronic device can be any stationary or mobile computing device capable of data processing, such as the mobile computing device for example a notebook computer, a smart phone, and a wearable device, or the stationary computing device for example a desktop computer or a server, or other types of computing devices, which are not limited in this disclosure.

It should be noted that the foregoing description of embodiments of the method for training a model for identifying noise samples is also applicable to the apparatus for training a model for identifying noise samples provided by the disclosure, and details are not repeated herein.

The apparatus for training a model for identifying noise samples provided by embodiments of the disclosure obtains an original sample set, in which each original training corpus in the original sample set has a corresponding label, obtains a target sample set by adding masks to original training corpora in the original sample set using a preset adjustment rule, performs mask prediction on a plurality of target training corpora in the target sample set using an initial language model to obtain a second mask prediction character corresponding to each target training corpus, adjusts model parameters of the initial language model according to a difference between the second mask prediction character corresponding to each target training corpus and the label of the corresponding original training corpora, and determines the language model obtained after adjusting as a language model for identifying noise samples, which realizes the training of the initial language model, and obtains a language model that can efficiently and accurately identify noise samples and save human resources.

Figure 9:
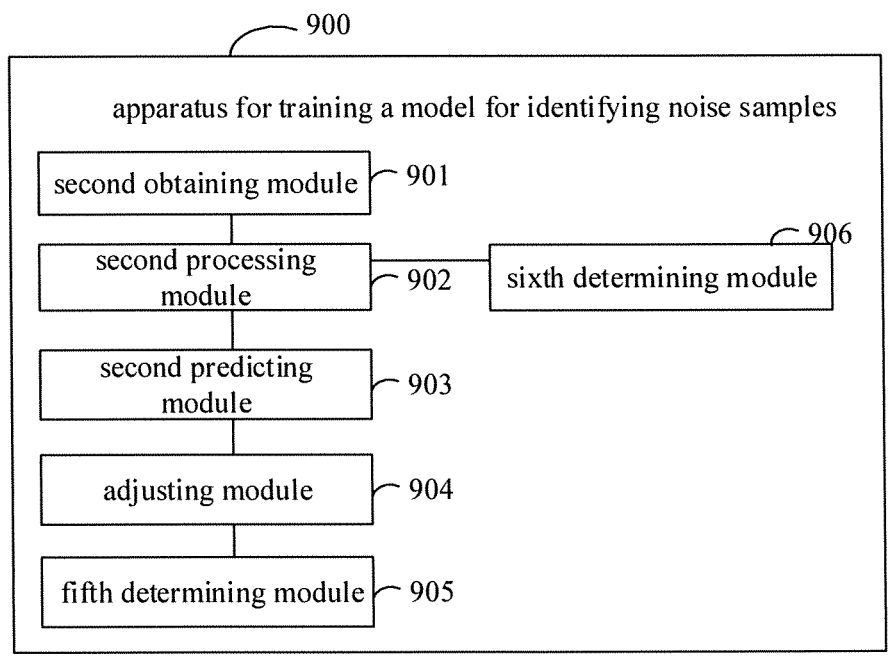
FIG. 9 is a block diagram of an apparatus for training a model for identifying noise samples according to a ninth embodiment of the disclosure.

The following describes the apparatus for training a model for identifying noise samples provided by the disclosure with reference to FIG. 9.

FIG. 9 is a block diagram of an apparatus for training a model for identifying noise samples according to a ninth embodiment of the disclosure.

As shown in FIG. 9, the apparatus 900 for training a model for identifying noise samples may include a second obtaining module 901, a second processing module 902, a second predicting module 903, an adjusting module 904 and a fifth determining module 905. The second obtaining module 901, the second processing module 902, the second predicting module 903, the adjusting module 904 and the fifth determining module 905 in FIG. 9 are the same as the second obtaining module 801, the second processing module 802, the second predicting module 803, the adjusting module 804 and the fifth determining module 805 in the function and structure.

In some embodiments, the initial language model includes a masked pre-trained language model.

The apparatus 900 further includes a sixth determining module 906, configured to determine the adjustment rule according to a training task performed by the masked pre-trained language model during a pre-training process.

It should be noted that the foregoing description of embodiments of the method for training a model for identifying noise samples is also applicable to the apparatus for training a model for identifying noise samples provided by the disclosure, and details are not repeated herein.

The apparatus for training a model for identifying noise samples provided by embodiments of the disclosure obtains an original sample set, in which each original training corpus in the original sample set has a corresponding label, obtains a target sample set by adding masks to original training corpora in the original sample set using a preset adjustment rule, performs mask prediction on a plurality of target training corpora in the target sample set using an initial language model to obtain a second mask prediction character corresponding to each target training corpus, adjusts model parameters of the initial language model according to a difference between the second mask prediction character corresponding to each target training corpus and the label of the corresponding original training corpora, and determines the language model obtained after adjusting as a language model for identifying noise samples, which realizes the training of the initial language model, and obtains a language model that can efficiently and accurately identify noise samples and save human resources.

According to some embodiments of the disclosure, the disclosure also provides an electronic device, a readable storage medium and a computer program product.

Figure 10:
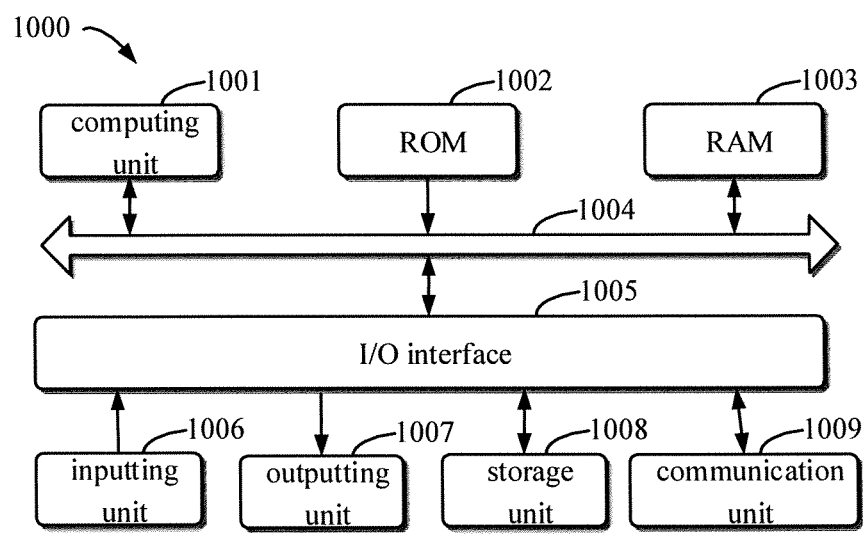
FIG. 10 is a block diagram of an electronic device for implementing a method for identifying noise samples or a method for training a model for identifying noise samples according to embodiments of the disclosure.

FIG. 10 is a block diagram of an example electronic device 1000 for implementing a method for identifying noise samples or a method for training a model for identifying noise samples according to embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 10, the device 1000 includes a computing unit 1001 performing various appropriate actions and processes according to computer programs stored in a read-only memory (ROM) 1002 or computer programs loaded from the storage unit 1008 to a random access memory (RAM) 1003. In the RAM 1003, various programs and data required for the operation of the device 1000 are stored. The computing unit 1001, the ROM 1002, and the RAM 1003 are connected to each other through a bus 1004. An input/output (I/O) interface 1005 is also connected to the bus 1004.

Components in the device 1000 are connected to the I/O interface 1005, including: an inputting unit 1006, such as a keyboard, a mouse; an outputting unit 1007, such as various types of displays, speakers; a storage unit 1008, such as a disk, an optical disk; and a communication unit 1009, such as network cards, modems, and wireless communication transceivers. The communication unit 1009 allows the device 1000 to exchange information/data with other devices through a computer network such as the Internet and/or various telecommunication networks.

The computing unit 1001 may be various general-purpose and/or dedicated processing components with processing and computing capabilities. Some examples of computing unit 1001 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 1001 executes the various methods and processes described above. For example, in some embodiments, the method may be implemented as a computer software program, which is tangibly contained in a machine-readable medium, such as the storage unit 1008. In some embodiments, part or all of the computer program may be loaded and/or installed on the device 1000 via the ROM 1002 and/or the communication unit 1009. When the computer program is loaded on the RAM 1003 and executed by the computing unit 1001, one or more steps of the method described above may be executed. Alternatively, in other embodiments, the computing unit 1001 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections according to one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), the Internet and a block-chain network.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in a cloud computing service system, in order to solve the existing defects of difficult management and weak business expansion in traditional physical hosting and virtual private server (VPS) services. The server can also be a cloud server, a server of a distributed system, or a server combined with a block-chain.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure

The invention claimed is:

1. A method for identifying noise samples, performed by an electronic device, comprising:
obtaining an original sample set;
obtaining a target sample set by adding masks to original training corpora in the original sample set using a preset adjustment rule;
performing mask prediction on a plurality of target training corpora in the target sample set using a language model to obtain a first mask prediction character corresponding to each target training corpus;
matching the first mask prediction character corresponding to each target training corpus with a preset condition;
according to target training corpora of which first mask prediction characters do not match the preset condition in the target sample set, determining corresponding original training corpora in the original sample set as noise samples;
modifying the noise samples; and
updating the original sample set using the modified noise samples; and continuing to train the language model based on the modified noise samples until the language model satisfies a requirement of a downstream application,
wherein the language model is obtained by training a masked pre-trained language model using the plurality of target training corpora in the target sample set,
wherein the method further comprises:
determining the adjustment rule according to a training task performed by the masked pre-trained language model during a pre-training process,
wherein the training task comprises a text classification task; and the preset adjustment rule comprises:
for each original training corpus, splicing the original training corpus and a spliced text to obtain a target training corpus corresponding to the training task; wherein, the spliced text is obtained by splicing a text segment in the original training corpus and a second category label mask through a second associated word, and the second category label mask indicates that a corresponding position is predicted as a category corresponding to the text segment;
wherein each original training corpus in the original sample set has a label, and the language model is determined by:
performing mask prediction on a plurality of target training corpora in the target sample set using the masked pre-trained language model to obtain a second mask prediction character corresponding to each target training corpus;
adjusting model parameters of the masked pre-trained language model according to a difference between the second mask prediction character corresponding to each target training corpus and the label of the corresponding original training corpora; and
determining the language model obtained after adjusting as the language model for identifying noise samples.

2. The method of claim 1, wherein obtaining the target sample set by adding the masks to the original training corpora in the original sample set using the preset adjustment rule comprises:
obtaining a plurality of target training corpora corresponding to the training task by adding the masks to a plurality of original training corpora in the original sample set; and
generating the target sample set corresponding to the training task according to the plurality of target training corpora corresponding to the training task.

3. The method of claim 1, wherein each original training corpus in the original sample set has a label; and the language model has learned to obtain a mapping relationship between an input target training corpus and a label of a corresponding original training corpus.

4. The method of claim 1, wherein the first mask prediction character indicates a prediction category corresponding to the target training corpus, and the preset condition includes that the prediction category belongs to a set of prediction categories; and
the method further comprises:
in response to a first prediction category corresponding to a first target training corpus belonging to the set of prediction categories, determining that the first mask prediction character corresponding to the first target training corpus matches the preset condition; and
in response to a second prediction category corresponding to a second target training corpus not belonging to the set of prediction categories, determining that the first mask prediction character corresponding to the second target training corpus does not match the preset condition.

5. A method for training a model for identifying noise samples, comprising:
obtaining an original sample set, wherein each original training corpus in the original sample set has a label;
obtaining a target sample set by adding masks to original training corpora in the original sample set using a preset adjustment rule;
performing mask prediction on a plurality of target training corpora in the target sample set using an initial language model to obtain a second mask prediction
character corresponding to each target training corpus;
adjusting model parameters of the initial language model
according to a difference between the second mask
prediction character corresponding to each target training corpus and the label of the corresponding original
training corpora; and
determining the language model obtained after adjusting
as a language model for identifying noise samples;
wherein the initial language model comprises a masked
pre-trained language model; and before obtaining the
target sample set by adding the masks to the original
training corpora in the original sample set using the
preset adjustment rule, the method further comprises:
determining the adjustment rule according to a training
task performed by the masked pre-trained language
model during a pre-training process,
wherein the training task comprises a text classification
task; and
the preset adjustment rule comprises:
for each original training corpus, splicing the original
training corpus and a spliced text to obtain a target
training corpus corresponding to the training task;
wherein, the spliced text is obtained by splicing a text
segment in the original training corpus and a second
category label mask through a second associated word,
and the second category label mask indicates that a
corresponding position is predicted as a category corresponding to the text segment.

6. An electronic device, comprising:
a processor; and
a memory communicatively coupled to the processor;
wherein,
the memory is configured to store instructions executable
by the processor, and when the instructions are
executed by the processor, the is configured to:
obtain an original sample set;
obtain a target sample set by adding masks to original
training corpora in the original sample set using a
preset adjustment rule;
perform mask prediction on a plurality of target training
corpora in the target sample set using a language model
to obtain a first mask prediction character corresponding to each target training corpus;
match the first mask prediction character corresponding to
each target training corpus with a preset condition;
according to target training corpora of which first mask
prediction characters do not match the preset condition
in the target sample set, determine corresponding original training corpora in the original sample set as noise
samples;
modify the noise samples; and
update the original sample set using the modified noise
samples; and continue to train the language model
based on the modified noise samples until the language
model satisfies a requirement of a downstream application,
wherein the processor is configured to:
determine the adjustment rule according to a training task
performed by the masked language model during a
pre-training process,
wherein the language model is obtained by training a
masked pre-trained language model using the plurality
of target training corpora in the target sample set,
wherein the training task comprises a text classification
task; and the preset adjustment rule comprises:
for each original training corpus, splicing the original
training corpus and a spliced text to obtain a target
training corpus corresponding to the training task;
wherein, the spliced text is obtained by splicing a text
segment in the original training corpus and a second
category label mask through a second associated word,
and the second category label mask indicates that a
corresponding position is predicted as a category corresponding to the text segment;
wherein each original training corpus in the original
sample set has a label, and the processor is configured
to:
perform mask prediction on a plurality of target training
corpora in the target sample set using a masked pre-trained language model to obtain a second mask prediction character corresponding to each target training
corpus;
adjust model parameters of the masked pre-trained language model according to a difference between the
second mask prediction character corresponding to
each target training corpus and the label of the corresponding original training corpora; and
determine the language model obtained after adjusting as
a language model for identifying noise samples.

7. The device of claim 6, wherein the processor is
configured to:
obtain a plurality of target training corpora corresponding
to the training task by adding the masks to a plurality
of original training corpora in the original sample set;
and
generate the target sample set corresponding to the training task according to the plurality of target training
corpora corresponding to the training task.

8. The device of claim 6, wherein each original training
corpus in the original sample set has a label; and the
language model has learned to obtain a mapping relationship
between an input target training corpus and a label of a
corresponding original training corpus.

9. The device of claim 6, wherein the first mask prediction
character indicates a prediction category corresponding to
the target training corpus, and the preset condition includes
that the prediction category belongs to a set of prediction
categories; and
the processor is configured to:
in response to a first prediction category corresponding to
a first target training corpus belonging to the set of
prediction categories, determine that the first mask
prediction character corresponding to the first target
training corpus matches the preset condition; and
in response to a second prediction category corresponding
to a second target training corpus not belonging to the
set of prediction categories, determine that the first
mask prediction character corresponding to the second
target training corpus does not match the preset condition.

10. A non-transitory computer-readable storage medium
having computer instructions stored thereon, wherein the
computer instructions are configured to cause a computer to
perform the method according to claim 1.

* * * * *